Jan. 3, 1950   R. K. LE BLOND ET AL   2,493,299
HYDRAULIC GEAR SHIFTING MECHANISM
Filed June 20, 1945   10 Sheets-Sheet 1
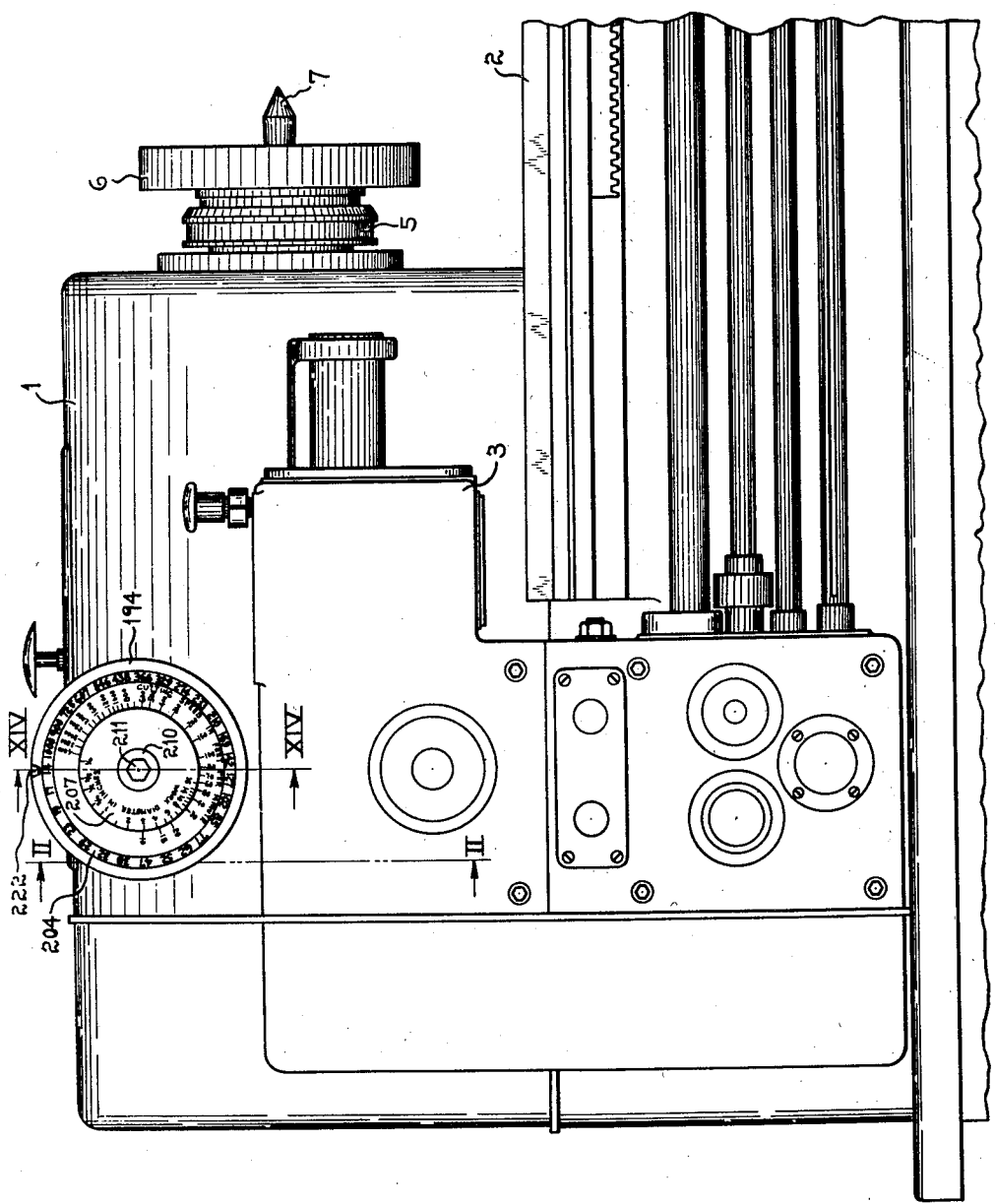
FIG. I
INVENTORS.
RICHARD K. LeBLOND
AND HARRY C. KEMPER
BY
ATTORNEYS.

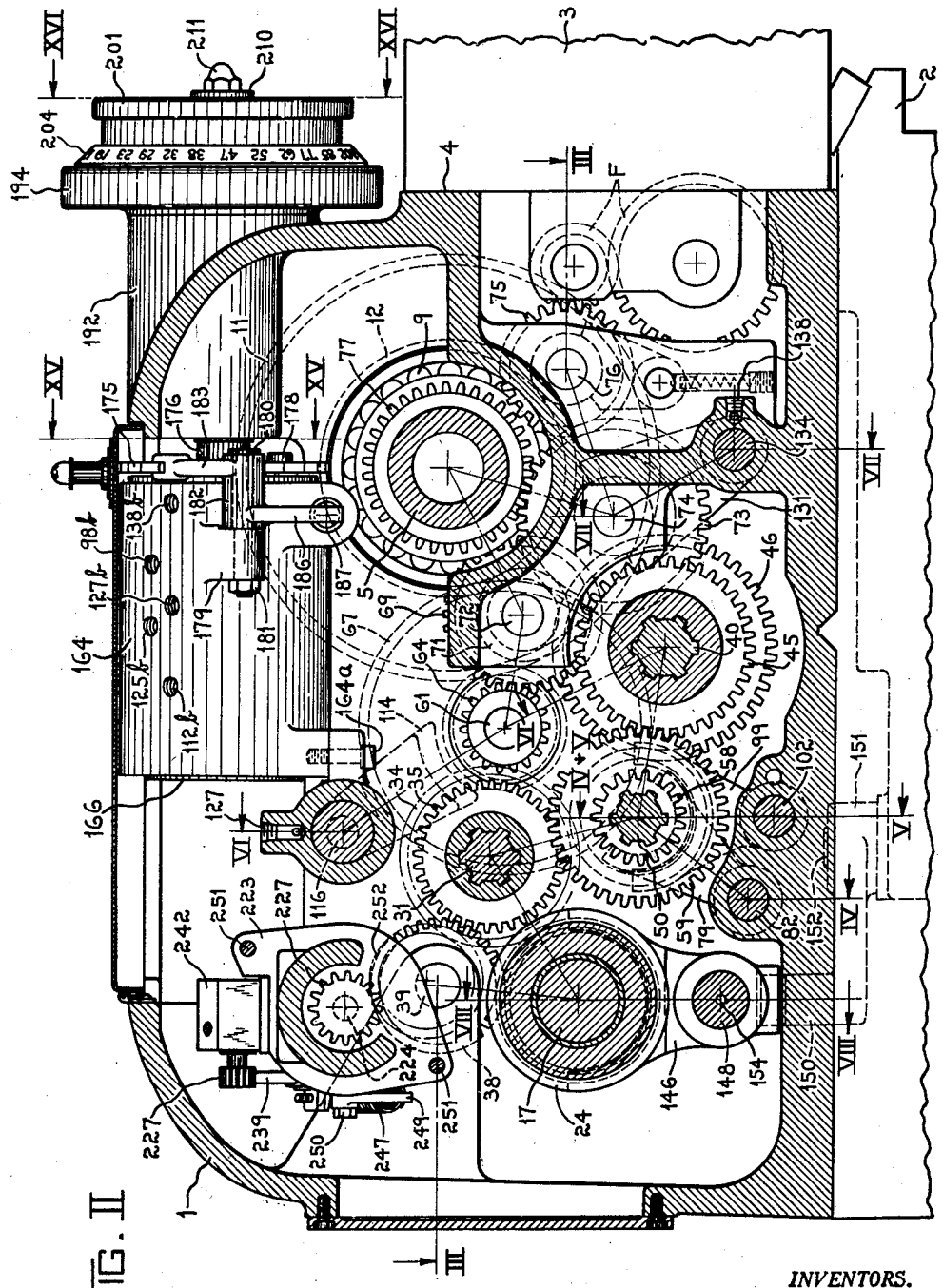

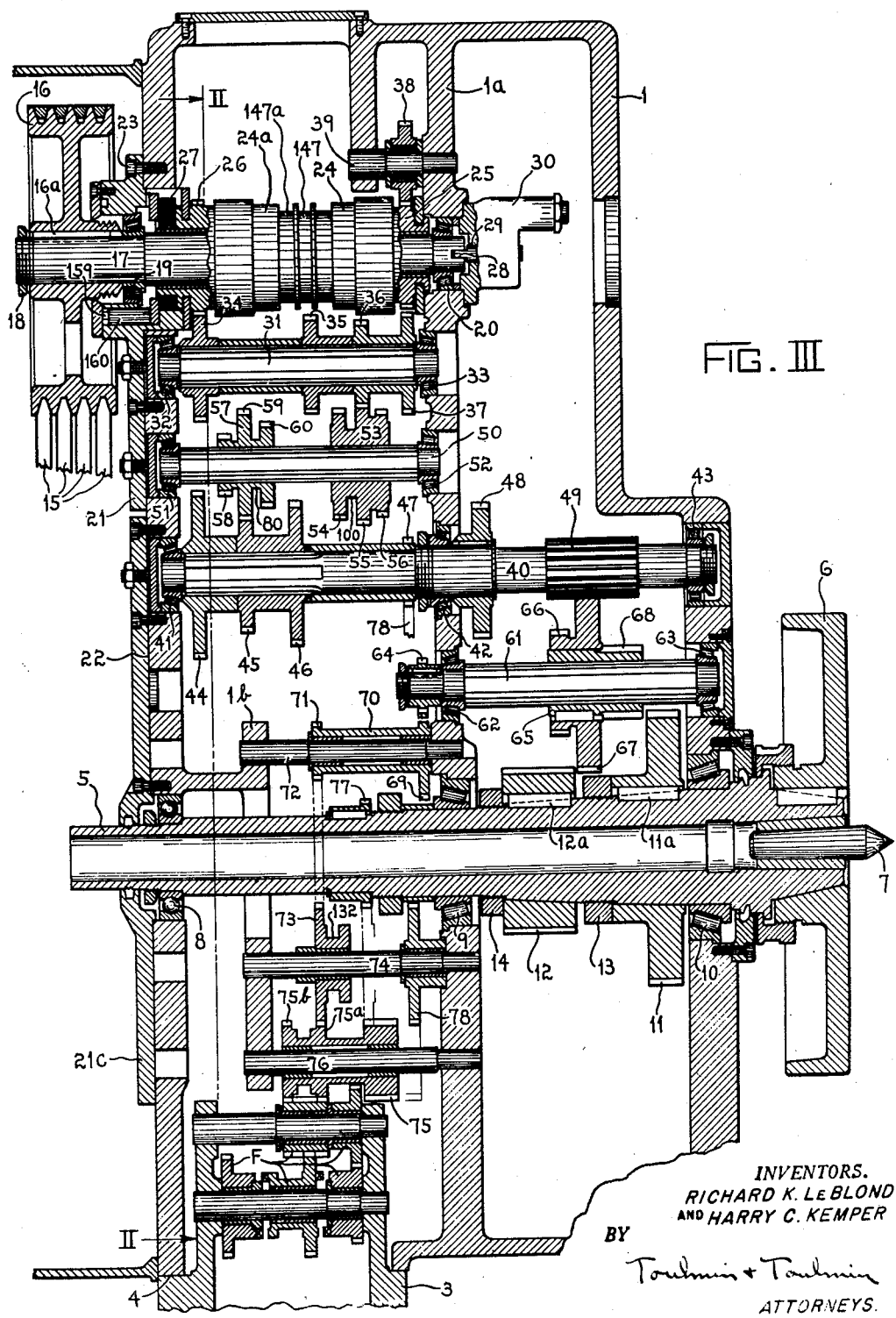
FIG. III
INVENTORS.
RICHARD K. LeBLOND
AND HARRY C. KEMPER
BY
Toulmin + Toulmin
ATTORNEYS.

Jan. 3, 1950 R. K. LE BLOND ET AL 2,493,299
HYDRAULIC GEAR SHIFTING MECHANISM
Filed June 20, 1945 10 Sheets-Sheet 4
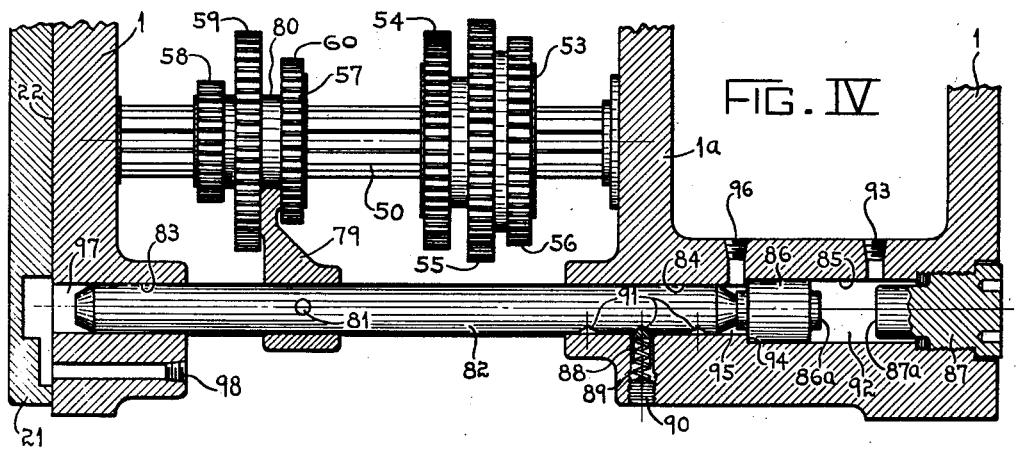
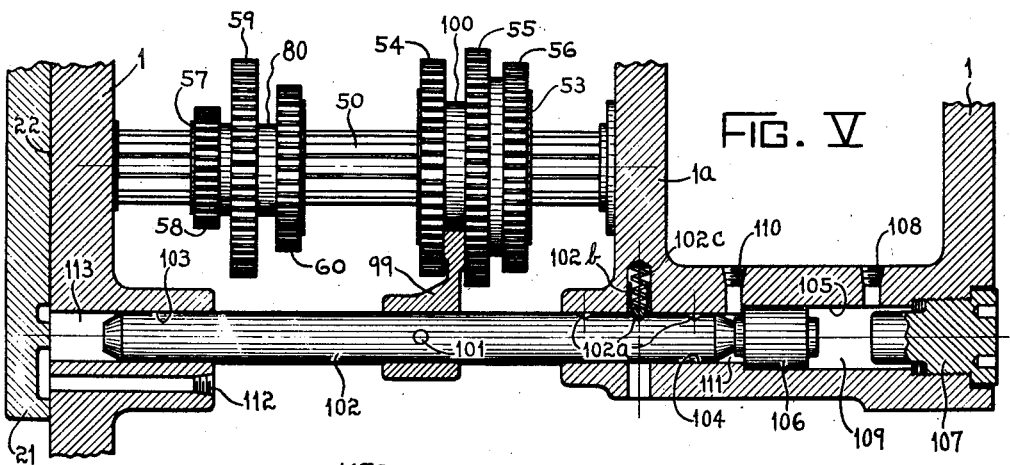
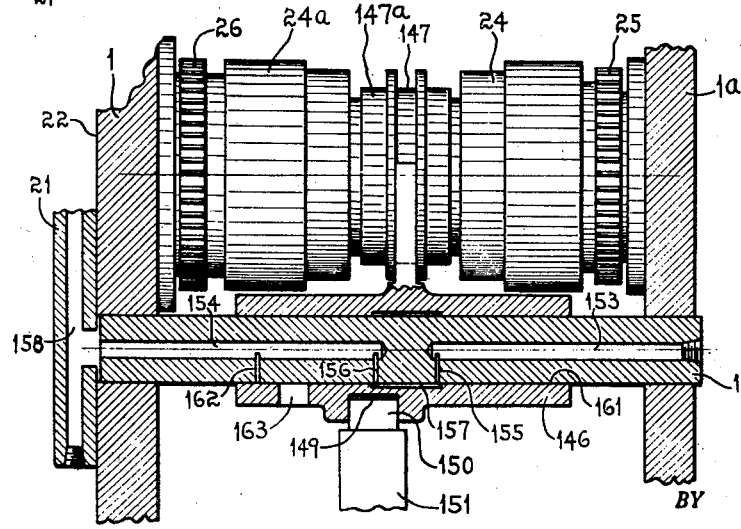
INVENTORS.
RICHARD K. LeBLOND
AND HARRY C. KEMPER
BY
Toulmin & Toulmin
ATTORNEYS.

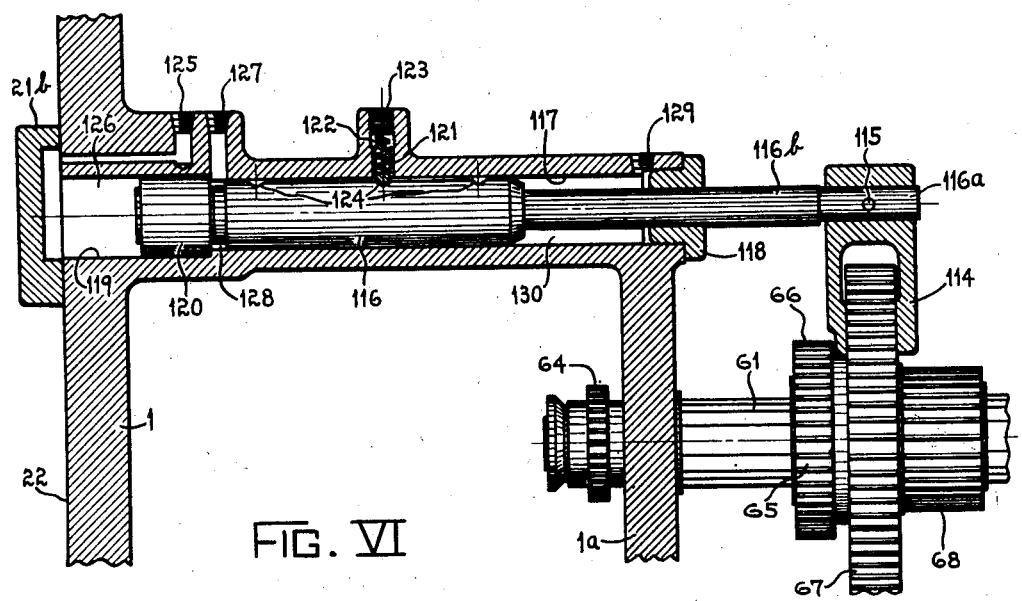
FIG. VI
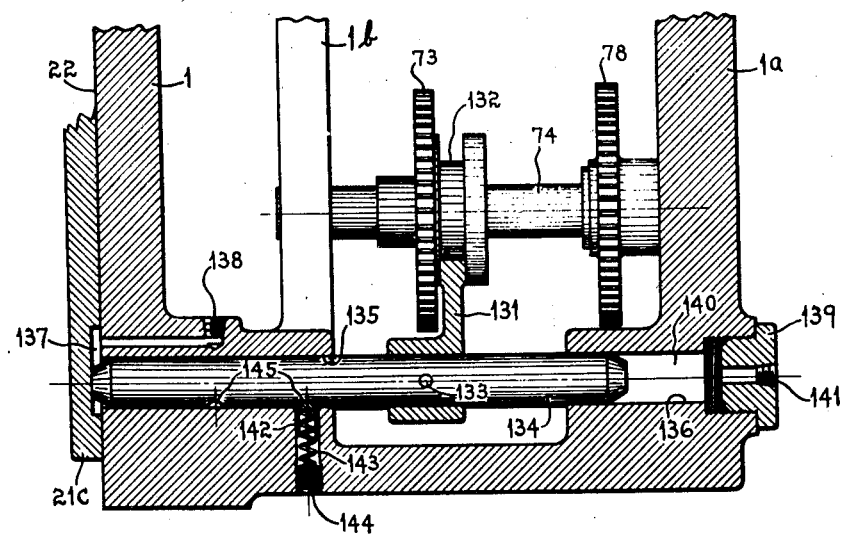
FIG. VII

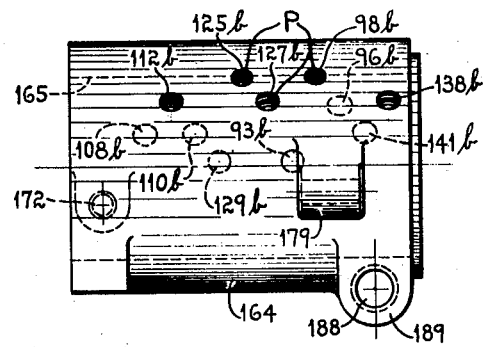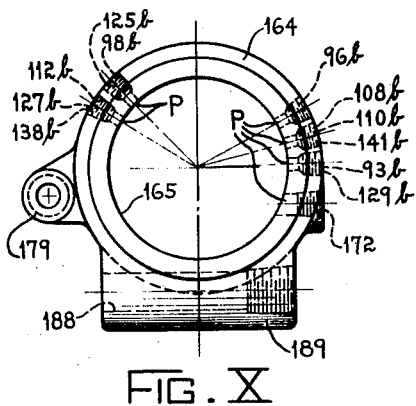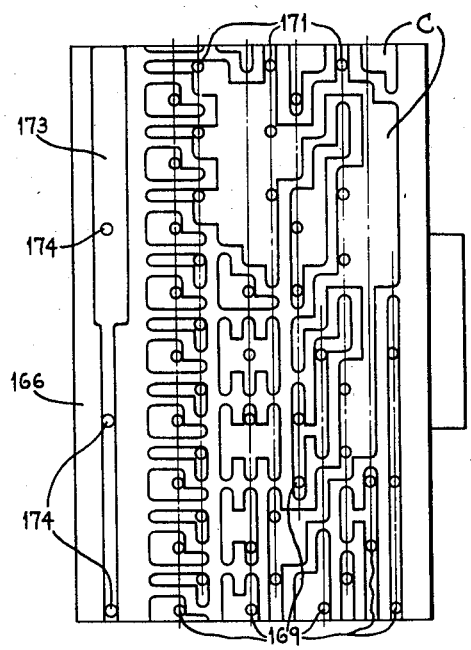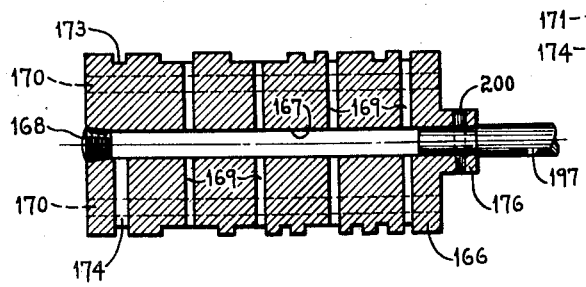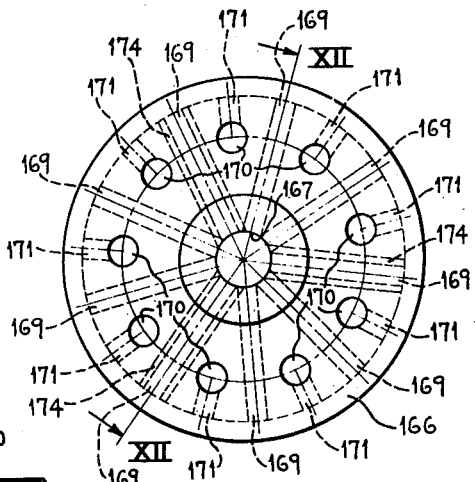

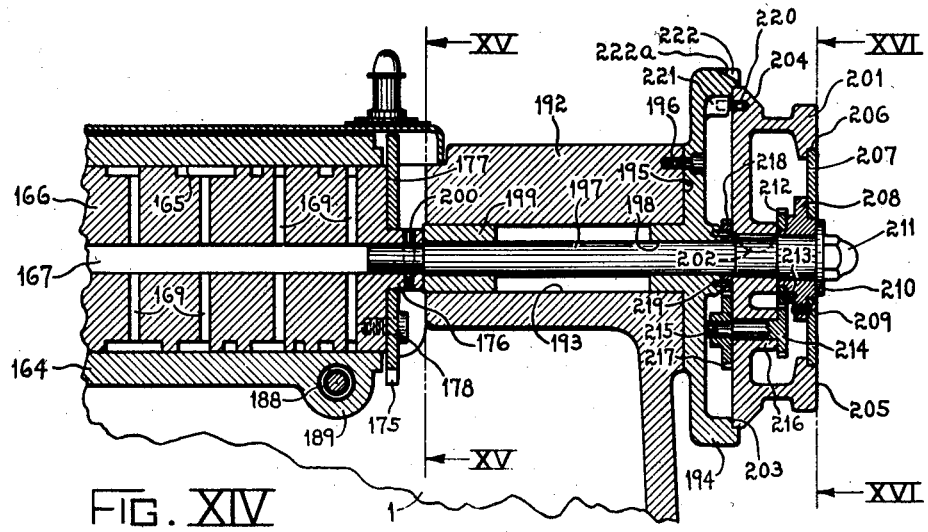
FIG. XIV
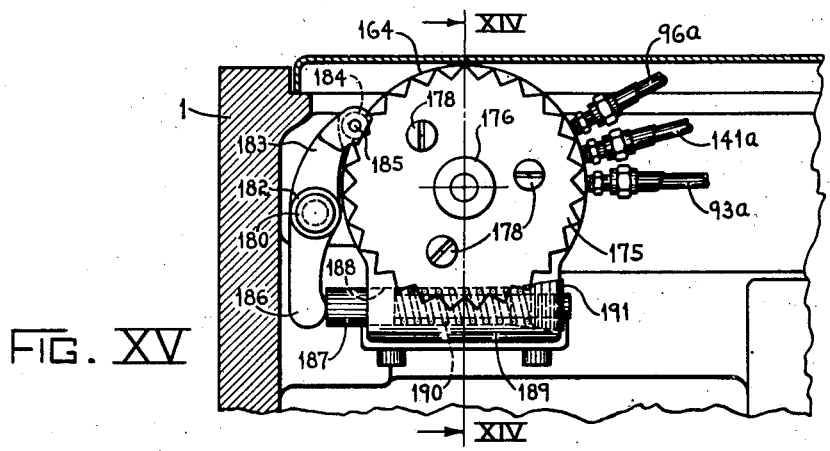
FIG. XV
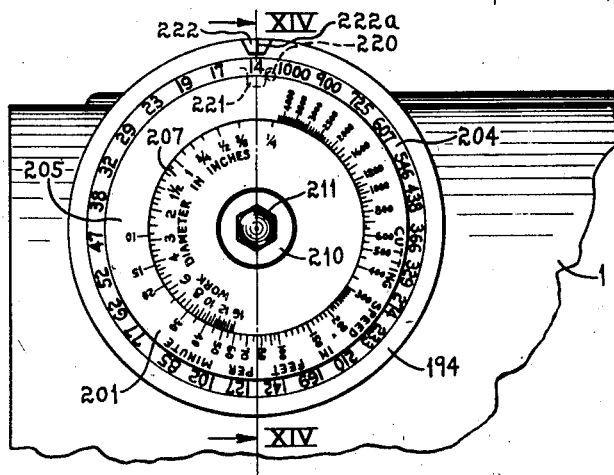
FIG. XVI
INVENTORS.
RICHARD K. LeBLOND
AND HARRY C. KEMPER
BY
Toulmin & Toulmin
ATTORNEYS.

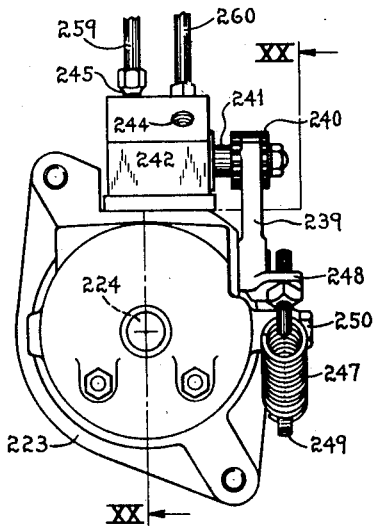
FIG. XVII
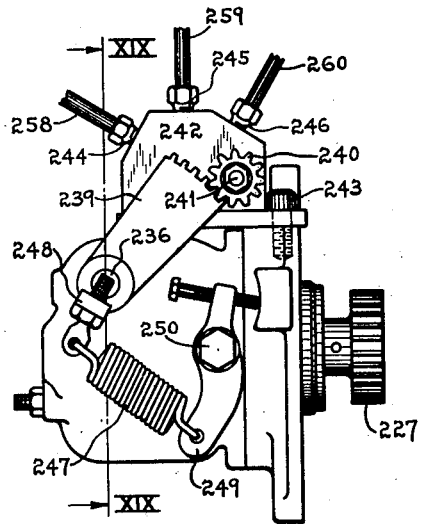
FIG. XVIII
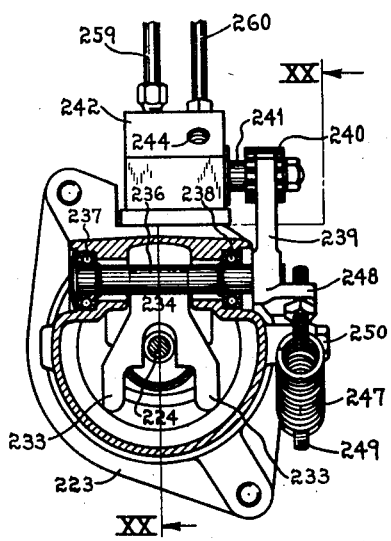
FIG. XIX
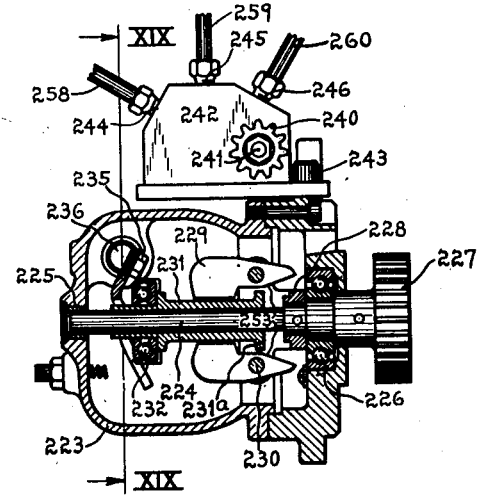
FIG. XX

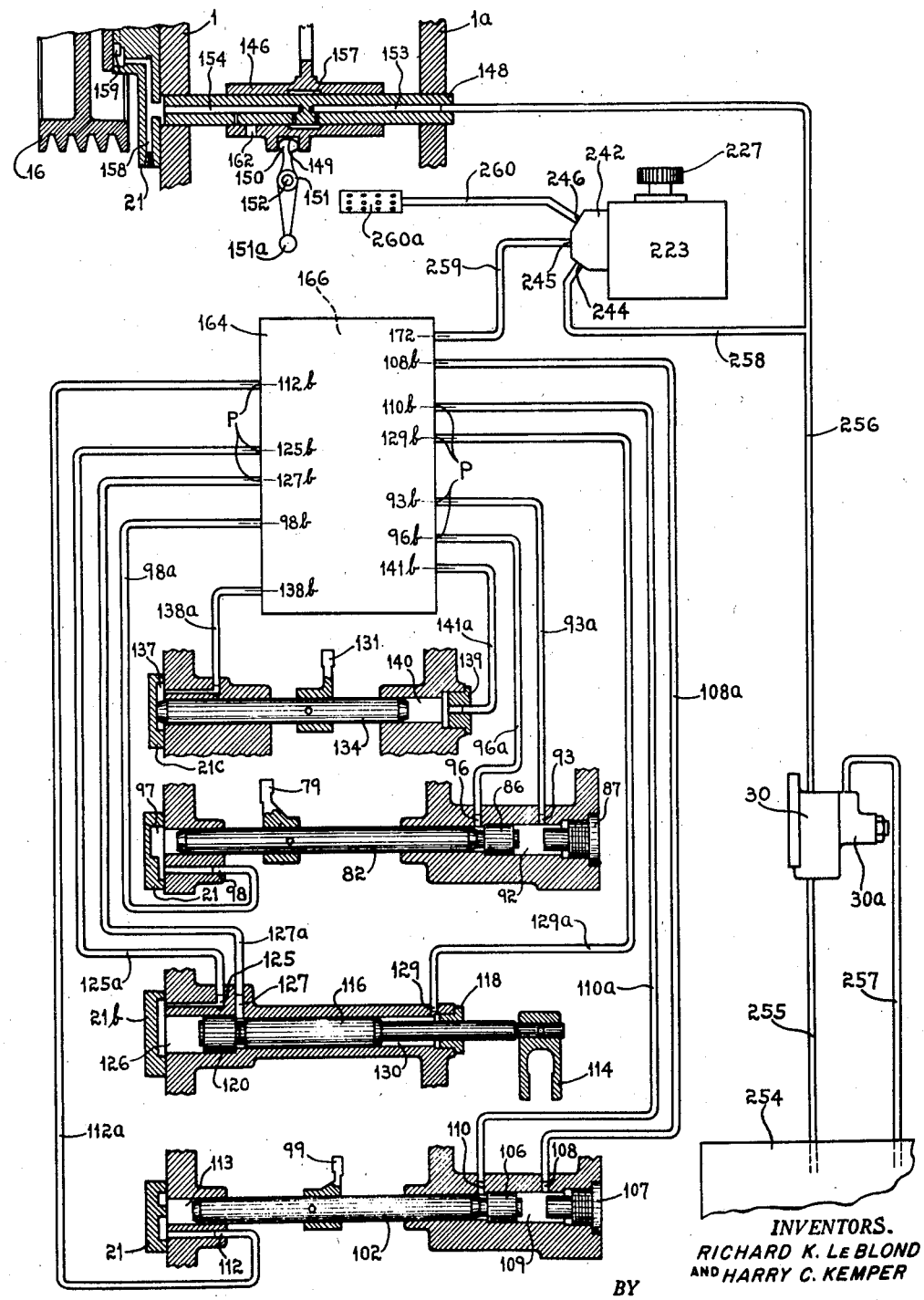
FIG. XXI
INVENTORS.
RICHARD K. LE BLOND
AND HARRY C. KEMPER
BY
Toulmin & Toulmin
ATTORNEYS.

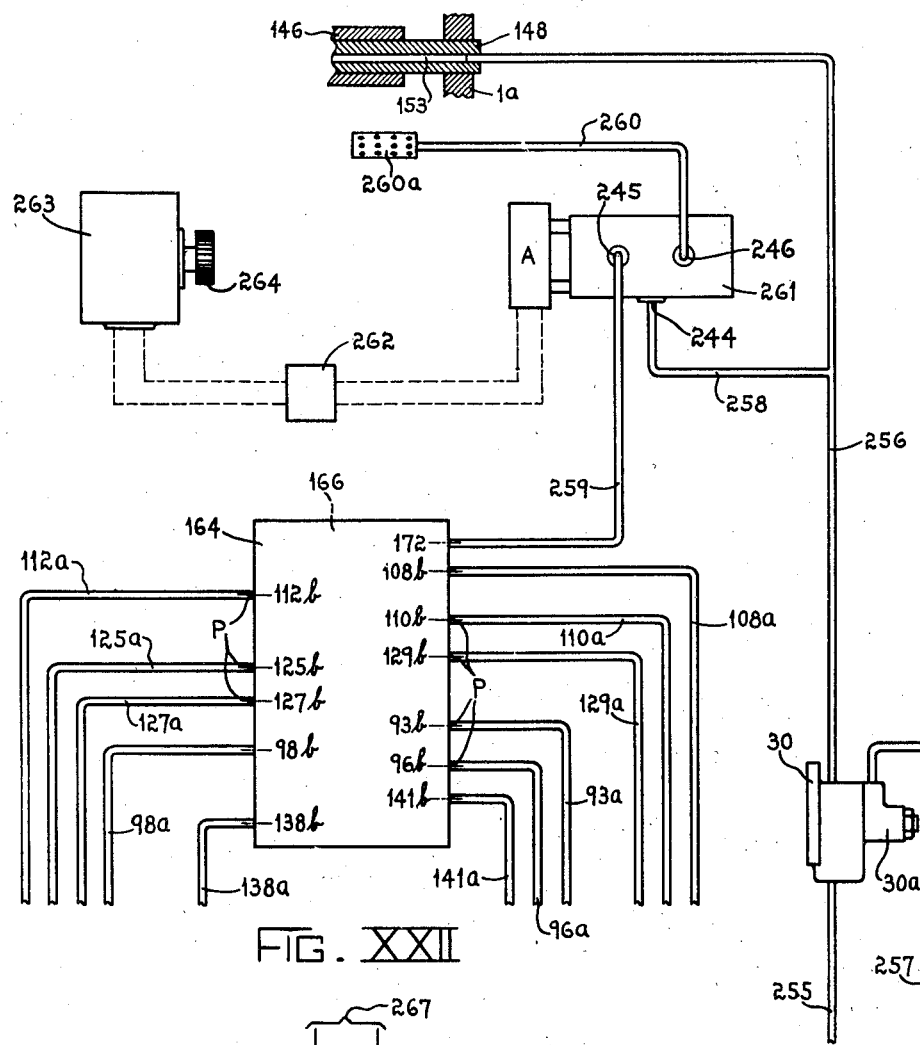
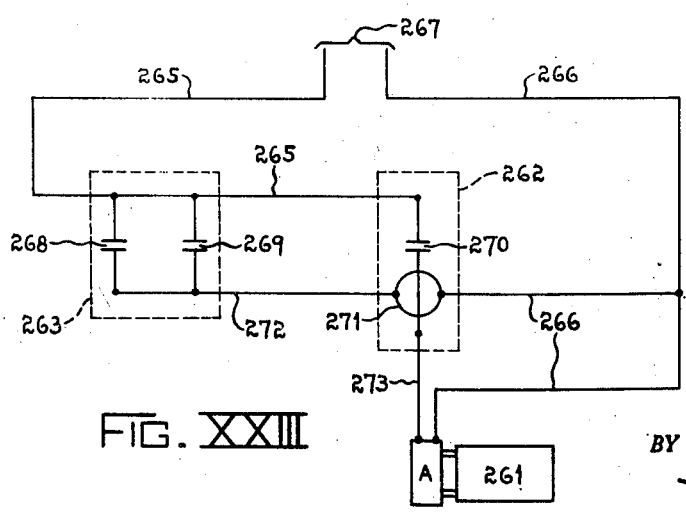

Patented Jan. 3, 1950

2,493,299

UNITED STATES PATENT OFFICE 2,493,299

HYDRAULIC GEAR SHIFTING MECHANISM

Richard K. Le Blond, Cincinnati, and Harry C. Kemper, Goshen Township, Clermont County, Ohio, assignors to The R. K. LeBlond Machine Tool Co., Cincinnati, Ohio, a corporation of Delaware Application June 20, 1945, Serial No. 600,584

14 Claims. (Cl. 192—4)

This invention pertains to improvements in hydraulic gear shifting mechanism for selectively directing a source of fluid pressure to a plurality of pressure actuated devices for speed changes in a change speed transmission.

In lathes of the type to which this invention is particularly well adapted, a very wide speed range for the work spindle is required in order to meet the needs of both machining large diameter work pieces with ordinary cutting tools and for machining smaller work at very high speeds with modern carbide cutting tools. As a result, it is necessary to provide a transmission having both a wide range of speeds which may be readily adjusted with a minimum of effort and thought upon the part of the operator together with means automatically coordinated with this wide speed range changing device which also changes the rates of feed to the cutting tool in relation to the spindle speeds selected.

It is found, in the lower ranges of spindle speed where normal feed rates of a moderately coarse nature are required for ordinary cutting tools, that these feed rates are not satisfactory when very high spindle speeds are utilized in connection with carbide cutting tools. In this latter instance of high speed operation, it is necessary to provide relatively fine feed rates for the tool while at the same time maintaining a high cutting speed in feet per minute between work and tool to obtain the necessary high degree of efficiency from modern carbide cutting tools. Therefore, the transmission mechanism for a lathe capable of accomplishing these results must not only have a speed changing device easily operable to affect a very wide range of speed selections for the spindle but must also incorporate mechanism coordinated with the speed changing mechanism for decreasing feed rates when high spindle speed rates are selected and to automatically restore regular coarser feed rates when the lower speed ranges are used, the entire mechanism being controlled from a single, manually operable device having direct reading dial mechanism for selecting all operating conditions for the machine.

More particularly, this invention pertains to power operated mechanism for selectively shifting the gearing of a change speed gear transmission for the spindle drive of a lathe headstock including mechanism for making a preselection of any desired speed while the machine is in operation and means for automatically changing the feed rates for the cutting tool in relation to the speeds selected for the work spindle.

One of the objects of this invention lies in the provision of a governor control mechanism associated with the selector valve and dial setting arrangement to automatically confine the shifting of the various gears which have been preselected to certain conditions of operation of the change speed transmission.

And a still further object is to provide an arrangement in conjunction with the hydraulic gear shifting mechanism of a lathe for automatically controlling the feed drive transmission to effect predetermined rates of feeding movement for the cutting tool when predetermined ranges of speed selections are made for the work spindle.

And still another object is to provide in a lathe, having a change speed transmission and a feed drive transmission associated with said change speed transmission, a power operated speed changing device which is adapted to simultaneously control the change speed transmission and the feed drive transmission to automatically vary their rates of power transmission in a predetermined relationship to one another.

And a further object of this invention is to provide in a lathe, having a change speed transmission for varying the rate of rotation of the work spindle and a feed drive transmission including means for changing the rate of feeds to the cutting tool, a hydraulically operated gear shifting device operable to simultaneously control both of said transmissions so as to automatically decrease the rate of feeds to the cutting tool when high spindle speeds are selected and to automatically increase the rate of feeds to the tool when the spindle is operated in lower speed ranges.

Further features and advantages of our invention will appear from the following detailed description of the drawings in which:

Figure I is a fragmentary front elevation of the headstock portion of a lathe incorporating the features of this invention.

Figure II is a vertical transverse sectional view through the headstock on the line II—II of Figures I and III.

Figures III is a diagrammatic section through the headstock transmission gearing on the line III—III of Figure II.

Figure IV is a fragmentary sectional view on the line IV—IV of Figure II showing hydraulically actuated gear shifting members.

Figure V is a fragmentary sectional view, similar to Figure IV, on the line V—V of Figure II.

Figure VI is a fragmentary sectional view, similar to Figure IV, on the line VI—VI of Figure II.

Figure VII is a fragmentary sectional view, similar to Figure IV, on the line VII—VII of Figure II.

Figure VIII is a fragmentary sectional view of the actuating and control mechanism for the main drive clutch and brake for the headstock transmission, on the line VIII—VIII of Figure II.

Figure IX is a side elevational view of the speed selector valve casing.

Figure X is a right-hand end view of the selector valve casing shown in Figure IX.

Figure XI is an enlarged end view of the selector valve rotor.

Figure XII is a longitudinal section of the selector valve rotor on the line XII—XII of Figure XI.

Figure XIII is an extended peripheral view of the selector valve rotor shown in Figures XI and XII.

Figure XIV is a fragmentary vertical transverse section on the line XIV—XIV of Figures I, XV, and XVI showing the dial indicating mechanism with the selector valve rotor.

Figure XV is a fragmentary sectional view shown on the line XV—XV of Figures II and XIV showing the ratchet locking mechanism associated with the dial setting mechanism.

Figure XVI is an enlarged front view shown on the line XVI—XVI of Figures II and XIV.

Figure XVII is a left-hand end view of the governor control valve assembly which controls the flow of fluid pressure to the selector valve.

Figure XVIII is a side elevation of the governor control valve shown in Figure XVII.

Figure XIX is a section on the line XIX—XIX of Figures XVIII and XX.

Figure XX is a section on the line XX—XX of Figures XVII and XIX.

Figure XXI is a diagram of the hydraulic circuit associated with the power operated speed changing mechanism.

Figure XXII is a diagram of a modified hydraulic circuit for the power operated speed changing mechanism.

Figure XXIII is a diagram of the electric circuit used in connection with the solenoid actuated control valve in the hydraulic circuit of Figure XXII.

As an example of a machine to which this invention is particularly adapted, there is shown a lathe having a headstock housing 1 which is securely fixed on the bed 2 and has the usual feed box 3 fixed to the front surface 4 thereof. The usual spindle 5 carrying the face plate 6 and center 7 is rotatably mounted in the headstock housing 1 on the anti-friction bearings 8, 9 and 10 and has securely fixed thereon the driving gears 11 and 12 by appropriate keys 11A and 12A and the threaded collars 13 and 14.

The headstock is driven from the usual main drive motor (not shown) through appropriate V belts 15 operating over the main drive pulley 16 fixed on the input drive shaft 17 by an appropriate key 16A and the lock nut 18. The drive shaft 17 is mounted on the anti-friction bearings 19 and 20 one of which is carried in a bracket 21 which is fixed to the left-hand end surface 22 of the headstock housing 1 by the screws 23 and the other fixed in the rib portion 1a of the headstock housing 1. Also mounted on the drive shaft 17 is the forward and reverse clutch shown generally at 24 the driving gears 25 and 26 and the brake mechanism 27. The extreme right-hand end of the shaft 17 contains an appropriate slot 28 which drivingly engages a shaft 29 of the hydraulic pump 30 which supplies fluid pressure for the hydraulic gear shifting and control mechanism for the headstock transmission.

Also carried in the headstock housing 1 is the spline shaft 31 mounted on anti-friction bearings 32 and 33. On this shaft are fixed the gears 34, 35, 36 and 37. It is to be noted, Figure III, that the forward drive is effected by operating the clutch 24A to connect gear 26 to the shaft 17 so that driving power will be directly transmitted to the gear 34. When the reverse clutch 24 is actuated the gear 25 will be connected to the shaft 17, while gear 26 is released, in which case power will now be transmitted through an idler gear 38 rotatably mounted on a stud 39 fixed in the headstock housing 1 to in turn transmit power in the reverse direction through the gear 37 to the shaft 31.

In the headstock housing 1 is an output or back gear shaft 40 mounted on the anti-friction bearings 41, 42 and 43 which has fixed on it the gears 44, 45, 46, 47, 48 and 49. This out-put shaft 40 derives its power from the shaft 31 through an intermediate shaft 50 mounted in the headstock housing 1 on the anti-friction bearings 51 and 52. Slidingly mounted on this splined intermediate shaft 50 is the sliding triple gear 53, comprising the gears 54, 55 and 56, which can be shifted to three different positions so that the splined intermediate shaft 50 can be driven at three different speeds through the gears 35—54, 36—55, or 37—56. It will also be noted a second triple gear 57 comprising, the gears 58, 59, and 60 is provided on this splined intermediate shaft 50 and can also be shifted to three different positions to effect the gear engagements 58—44, 59—45 or 60—46 so that the drive from the drive shaft 17 to the shaft 40 can be effected at nine different rates of speed both forward or reverse.

The spindle 5 is arranged to be driven at a total of twenty-seven different speeds ranging in this particular exemplary machine from 14 R. P. M. to 1000 R. P. M. This range of speeds is divided into three groups, namely a low range, a medium range, and a high range. The speeds available in the low range group start at 14 R. P. M. and progressively increase up to 52 R. P. M., the medium range from 62 R. P. M. to 233 R. P. M., and the high speed range from 274 R. P. M. to the maximum of 1000 R. P. M. To effect these various speed ranges from the output shaft 40 to the spindle 5, an intermediate splined shaft 61 is provided and is mounted in the headstock housing 1 on the anti-friction bearings 62 and 63. Mounted on the shaft 61 is the feed drive gear 64 and the shiftable triple gear 65 comprising the gears 66, 67 and 68.

When driving in the low range where power is needed for taking extremely heavy cuts, the triple gear 65, Figure III, is shifted to the right so that the gear 68 is in mesh with the large face gear 11 of the spindle 5. In this case the drive from the output shaft 40 is transmitted from the gear 49 through the gear 67 to the gear 68 which at this time is in engagement with the large gear 11 on the spindle 5. For the medium range of speeds the gear 65 is shifted to the left so that its gear 67 is in engagement with the gear 12 on the spindle 5 and in this instance the drive from the output shaft 40 is translated from the gear 49 through the gear 67 and to the gear 12. It will be noted at this time that the gear 49 of the output shaft 40 is made rather long so that the gear 67 will maintain engagement during the shifting to either of these positions. When the speeds of the high speed range are desired the triple gear 65 is shifted to its extreme left-hand position, Figure III, until the gear 66 enters into engagement with the gear 48 mounted on the output shaft 40. In this case the gear 67 disengages the gear 49 while maintaining engagement with the gear 12 and thus the drive is translated to the spindle through the gear 48 driving the gear 66 of the triple gear 65 and the gear 67 driving the gear 12 mounted on the spindle 5.

In machine tools such as the lathe here illustrated, the feed driving power for actuating the cutting tool in feeding movement is derived from the headstock transmission and work spindle in order to maintain proper synchronization of the rotary movement of the spindle and the feeding movement of the tool.

In this particular embodiment, when the high range of speeds is selected, a drive is provided for obtaining a fine range of feeds for actuating the cutting tool in feeding movement. This is effected by the gear 64 fixed on the end portion of the shaft 61 and which drives a gear 69 of the double gear 70. The double gear 70 comprises the gears 69 and 71 and is rotatably mounted on a shaft 72 fixed in the rib portions 1a and 1b of the headstock housing 1. This double gear 70 rotates at all times with the shaft 61. A shiftable feed rate change gear 73 is journalled for axial sliding movement on a shaft 74 fixed in the rib portions 1a and 1b. When the triple gear 75, journalled for axial movement on a shaft 76 fixed in the headstock 1, is shifted by suitable shifting means (not shown) to the position indicated in Figure III, it may be driven from the gear 71 through the gear 73 which is in mesh with the gear 75a of the triple gear 75. It may be noted at this point that the triple gear 75 when in either of its shifted positions always maintains driving engagement through its gears 75a and 75b with the gearing indicated generally at F in Figure III of the feed box 3.

When it is desired to cut regular threads or leads in either the medium or low speed ranges for the spindle, the gear 73 is shifted to the right until it engages a gear 77 fixed on the spindle 5. The feed drive is then transmitted from the spindle 5 and its gear 77 through the gear 73 to the gear 75 and then through the gear 75a and 75b to the gearing F of the feed box 3.

When it is desired to do coarse threading with the work spindle operating in the low range of speeds only, the gear 75 is manually shifted to the right, Figure III, until it engages the gear 78 which is journalled on the shaft 74. This gear 78 in turn is driven by the gear 47 mounted on the output or back gear shaft 40.

During the operation of the headstock in the medium or high speed ranges, the shifting of the gear 73 to change the feed rate for the cutting tool is automatically accomplished by a hydraulically actuated device controlled by the adjustment of the selector valve. When the low range of spindle speeds is being used and coarse threading is to be done, the gear 75 is manually shifted into engagement with the gear 78.

In referring to Figures IV, V, VI, and VII, the detailed construction of the hydraulic actuating or shifting mechanism for the various gears in the change speed transmission for the work spindle 5 and the feed drive transmission to the feed box 3 is shown. It will also be noted that these various shifting members are carried in boss-like portions formed integral with the headstock housing 1 thereby eliminating many parts that would be necessary if some other method were to be utilized.

In referring to Figure IV, a shifter yoke 79 is provided which in turn engages the annular slot 80 of the triple gear 57. The shifter yoke 79 is fixed by a suitable pin 81 on a shifter shaft 82 slidingly mounted in the bores 83 and 84 formed in the boss-like portions of the headstock housing 1. Aligned with an adjacent to the bore 84, a larger bore 85 is formed in the headstock housing 1 in which a piston 86 is mounted to slide axially by hydraulic actuation. A suitable threaded plug 87 closes the end of the bore 85 thereby forming a chamber into which fluid under pressure can enter to actuate the piston 86. The amount of travel for the piston 86 can also be regulated by the in and out adjustment of the threaded plug 87, the end portion 87a of which acts as a stop when engaged by the end portion 86a of the piston 86. Suitable spring plunger detent means comprising the detent plunger 88, spring 89, and set screw 90 is provided to operate in the detent notches 91 of the shifter shaft 82 to hold the gear 57 in proper positions when the shifter shaft 82 is not under fluid pressure.

As can be seen in referring to Figures III and IV, the gear 59 of the triple gear 57 is in intermediate position with its gear 59 in engagement with the gear 45 mounted on the output shaft 40. The gear 59 has been moved to this position by fluid pressure entering the chamber 92 from the port 93 forcing the piston 86 to move to the left, Figure IV, until it contacts the shoulder 94 of the chamber 92 and thereby moving the shifter shaft 82 to intermediate position. To engage the gear 58 with the gear 44 the shifter shaft 82 must again be moved to its next position to the left. At this time the pressure in chamber 92 remains in order to hold the piston 86 against the shoulder 94 while fluid pressure entering the chamber 95 from the port 96 acts to move the shifter shaft 82 to its left position, Figure IV. As this shifting is taking place, the fluid in the chamber 97 formed by the bore 83 and the plate 21 is being exhausted through the port 98. This procedure is reversed by releasing the pressure from the chamber 95 while maintaining pressure in chambers 92 and 97 for the intermediate position, and releasing pressure from both chambers 92 and 95 and applying pressure to the chamber 97 to move the triple gear 57 to extreme right position, Figure IV.

The shifting mechanism for the triple gear 53 is similar to that used for the triple gear 57, both gears 53 and 57 sliding on the same shaft 50 and having substantially the same shifting movements. In referring to Figure V, a shifter yoke 99 is provided which in turn engages the annular slot 100 of the triple gear 53. The shifter yoke 99 is fixed by a suitable pin 101 on the shifter shaft 102 slidingly mounted in the bores 103 and 104 formed in the boss-like portions of the headstock housing 1. Aligned with and adjacent to the bore 104 is formed a larger bore 105 in the headstock housing 1 in which a piston 106 is mounted to be hydraulically actuated. A suitable threaded plug 107 closes the end of the bore 105 thereby forming a chamber into which fluid under pressure can enter to actuate the piston 106. Suitable detent means comprising the plunger 102b, and spring 102c is provided to operate in the detent notches 102a formed in the shifter shaft 102 and acts to hold the gears in their proper positions when the shifter shaft 102 is not under the influence of fluid pressure in the hydraulic shifting mechanism. Suitable ports 108 and 110 connecting with the chambers 109 and 111 and the port 112 connecting with the chamber 113 formed by the bore 103 and the plate 21 furnish the means for shifting the gear 53 in the same manner and sequence as that for the gear 57 just described.

Figure VI shows the shifting arrangement for the triple gear 65 which translates the drive from the output or back gear shaft 40 to the spindle 5. A shifter 114 engaging the sides of the gear 67 is mounted and securely fixed with a suitable pin 115 on the end portion 116a of the shifter shaft 116. This shaft is slidingly mounted in a bore 117 formed in the boss-like portion of the headstock housing 1 and also has a reduced portion 116b which projects outwardly through a nut 118 threaded in the end of the bore 117 to thereby form a chamber into which fluid under pressure may enter. Aligned with and adjacent to the bore 117 is a larger bore 119 in which a piston 120 is slidingly mounted. Appropriate detent means comprising the plunger 121, spring 122 and set screw 123 is provided for engaging suitable detent notches 124 formed in the shifter shaft 116 to hold the gears in their proper positions when the shifter shaft 116 is not under the influence of the fluid pressure. Suitable ports, namely, the port 125 connecting with the chamber 126 formed by the bore 119 and the plate 21b, the port 127 connecting with the chamber 128, and the port 129 connecting with the chamber 130 are provided for receiving fluid under pressure and for shifting the triple gear 65 in a manner similar to that just described in Figures IV and V.

The shifting arrangement for the feed rate change gear 73, Figure VII, consists of a shifter yoke 131 which engages in the annular slot 132 of the gear 73 and is connected by a suitable pin 133 to the shifter shaft 134. The shifter shaft 134 is slidingly mounted in the bores 135 and 136 formed in boss-like portions of the headstock housing 1. A plate 21c fixed to the face 22 of the headstock housing 1 and associated with the bore 135 forms a chamber 137 which is connected by an appropriate port 138 through which fluid under pressure may be received. A nut 139 threaded in the end of the bore 136 forms a chamber 140 for receiving fluid under pressure through the port 141 formed therein. Suitable detent means comprising plunger 142, spring 143 and set screw 144 is provided for engaging the detent notches 145 formed in the shifter shaft 134 so that the gear 73 will be held in either of its shiftable positions when the pressure is released from the shifter shaft 134.

Referring to Figures VIII and XXI, it will be noted that the forward and reverse clutches 24a and 24 mounted on the drive shaft 17 are controlled by a shifter yoke 146 which engages the annular slot 147 of the clutch actuating spool 147a. The shifter yoke 146 is slidingly mounted on a shaft 148 fixed in the walls 1 and 1a of the headstock housing and has incorporated therein a slotted portion 149 which is operatively engaged by the end portion 150 of the lever arm 151 of the spindle stop and start lever 151a for the main drive to the headstock transmission. This lever 151 is mounted on a downwardly depending shaft 152, Figure II, which is journalled in the base 2 of the machine and through appropriate mechanism (not shown) is connected to the spindle stop and start lever 151a located on the front of the machine for manual control of the clutches 24a and 24 and the brake 27.

The shifting of these clutches for either forward or reverse driving of the spindle automatically disengages the brake 27. The clutches 24a and 24, Figure VIII, are in neutral position and the brake 27 is at this time operated by fluid pressure to keep the gear 27 from rotating and thereby stopping all of the gears of the headstock. Fluid pressure enters the port 153 formed in the shaft 148 and is forced into the port 154 by way of the slots 155 and 156 and the chamber 157 formed in the shifter yoke 146. From the port 154 the fluid enters a port 158 formed in plate 21 and which is directly connectable with the annular chamber 159 also formed in this plate 21. The brake 27 is actuated by the plungers 160, Figure III, which in turn are controlled by pressure in the chamber 159 and the port 158.

When the shifter yoke 146 is moved to the right or left, Figures VIII and XXI, for setting the clutch 24 in its forward or reverse position the brake 27 is automatically released by the movement of the yoke 146. It will be noted in Figure VIII that when the yoke 146 is moved in either direction the slots 155 and 156 are closed off by the bore 161 as the chamber 157 moves out of communication with either of the slots 155 and 156 so that the fluid under pressure in port 153 cannot flow into the port 154. As this is taking place the slot 162 is opened and the fluid in chamber 159 and ports 158 and 154 is allowed to exhaust at the end of the yoke 146 or through the opening 163 provided therein to thereby release the pressure on the plungers 160 and allow the brake 27 to again become free so that the gears 26 or 25 can again rotate to drive the headstock transmission in either the forward or reverse cycle.

Associated with these various shifting arrangements just described is a speed selector valve having a casing 164, Figures IX and X, fixed to the headstock 1 by screws 164a in which is formed a bore 165 through-out its entire length. For connecting the bore 165 with the fluid pressure lines of the various shifting mechanisms, appropriate radially extending ports P are formed in the side wall of the casing 164, and have threaded portions incorporated therewith into which the fittings of the lines may be connected. The selector valve has a rotor 166 of cylindrical shape which is nicely fitted in the bore 165 of the casing 164 and has formed in its peripheral surface a series of cavities C which form a series of chambers or fluid passageways when in the bore 165. A central bore 167 is formed in the selector rotor valve 166 one end of which is closed by a suitable plug 168. A series of radially disposed holes 169 are formed at spaced intervals in the valve rotor 166 and communicate with the bore 167 and with the cavities C so that fluid pressure in these cavities contacts the bore 165 of the casing 164. A number of longitudinally extending holes 170 are formed in the valve rotor 166 and these in turn are connected with various cavities C by a series of holes 171 so that upon rotation of the valve rotor 166 various chambers may be exhausted into the headstock.

For supplying the bore 167 with fluid pressure an appropriate inlet port 172 is provided in the casing 164 and connects directly with the cavity 173 formed in the peripheral surface of the valve rotor 166. The holes 174 connect this chamber 173 with the bore 167 to thereby allow free passage for the fluid pressure from the inlet port 172 to the bore 167 for any rotary position of the valve rotor in the casing 164. It might be noted, Figure XIII, that the cavities formed in the peripheral surface of the valve rotor 166 are so shaped that they cooperate with the bore 165 of the casing 164 so that pressure against the surface of the bore 165 will be equalized as nearly as possible to prevent binding of the rotor in the casing at any place. This construction permits easy rotation of the rotor at all times.

Associated with the selector valve rotor 166 is the port positioning detent device, Figures II, XIV, and XV, which serves to locate the rotor in the proper aligned positions for its various rotary settings. This device comprises the notched plate 175 which is fixed on the valve rotor 166 by the screws 178 so that the plate 175 and the valve 166 rotate as a unit. The number of notches formed in the periphery of this plate 175 corresponds with the number of positions to which the valve 166 may be set for effecting the different speed changes. In a boss 179 formed integral with the casing 164 is fixed the stud 180 with a suitable nut 181 and has mounted thereon for rocking motion the pawl 182. This pawl has an upwardly extending arm 183 in the upper bifurcated end of which is mounted roller 184 on a pin 185 for engaging the notches of the plate 175. Also formed integrally with the pawl 182 is a downwardly depending arm 186 which engages a plunger 187 mounted in a bore 188 formed in the boss 189 of the casing 164. A spring 190 confined in the bore 188 by a threaded plug 191 urges the plunger 187 against the arm 186 and thereby maintains contact between the roller 184 and the plate 175.

In Figures XIV and XVI is best shown the dial setting mechanism used for quickly setting the selector valve rotor 166 to its various positions to cause the desired shifting of the headstock transmission gearing. This mechanism is supported in a boss 192 formed integrally with the front face of the headstock housing 1 and has a bore 193 formed therein in aligned relation with the axis of the valve rotor 166. An appropriate hood shaped bracket 194 is mounted in the bore 193 and fixed securely to the front face 195 of the boss 192 by suitable screws 196. A shaft 197 rotatably mounted in a bore 198 of the bracket 194 projects inwardly into the headstock housing 1 and is also supported in a bush 199 fixed in the bore 193. The end of the shaft is fixed by a suitable pin 200 in the bore 167 of the valve rotor 166 and serves to close off the other end of the bore 167 from the end closed by the plug 168.

A spindle speed selector dial 201 is fixed on the shaft 197 by a suitable key 202 and is rotatable in a counter-bore 203 formed in the bracket 194 so that when the dial 201 is rotated manually this movement is translated to the valve rotor 166 through the shaft 197. As can best be seen in Figures I, II, and XVI, the angular face 204 of the dial 201 is inscribed at spaced intervals with a series of numerals ranging from 14 R. P. M. and progressively increasing to 1000 R. P. M. so that the readings on this dial correspond with the spindle speeds obtainable through the various shiftable combinations of the headstock transmission. It may also be noted that the front face 205 of the dial 201 has an appropriately graduated scale representing the cutting speed in feet per minute at which the work may be machined. This scale is arranged in logarithmic progression starting at ten feet per minute and increasing gradually to four thousand feet per minute and is inscribed along the edge of the counterbore 206 formed in the dial 201.

Operatively related to the dial 201 is a second dial 207 nicely fitting in the counterbore 206 of the dial 201 which is fixed to a hub 208 by the screws 209 the hub 208 in turn being rotatably mounted on the shaft 197 and secured thereon by the washer 210 and nut 211. Along the outer edge of the dial 207 and associated with the scale on the dial 201 is the graduated scale indicating work diameter in inches ranging from one quarter inch up to sixteen inches representing the different sizes of work adaptable for the machine. In order that the scale on the disk 207 and the scale on the dial 201 may at all times be rotated in synchronism, a gear drive is provided. This drive comprises the gear 212 which is fixed to the hub 208 by a pin 213 and which is driven by a gear 214 formed integrally with a shaft 215 rotatably mounted in the boss 216 formed integrally with the dial 201. On the other end of this shaft 215 is securely fixed by an appropriate pin the gear 217 which in turn engages the gear 218 secured by the pins 219 to the hub portion of the bracket 194. There is a possibility that if the spindle speed indicating dial 201 were rotated a number of times in one direction or the other that these scales would get out of proper timed relationship with each other. In order to prevent this, the speed indicating dial 201 is limited to one complete revolution in either direction. This is accomplished by providing a suitable pin 220 which is fixed in the dial 201 and which comes into engagement with a lug 221 formed integrally with the bracket 194 and acts as a stop for the dial 201 when being rotated in either direction. A slot 222 formed in the bracket 194 having a scribed line 222a serves as an indicator means and points out the number of revolutions of the spindle during the various shiftable positions of the headstock gearing.

With this unique dial arrangement, the various settings for the different operating conditions of the headstock may be directly read from the dials to adjust the headstock transmission for any size and character of work to be machined in the lathe. Reference on the part of the operator to various charts and index plates for the setting of the control levers present in former machine structures is wholly eliminated with this direct reading dial arrangement associated with the selector valve.

When operating such a lathe, the operator may know the desired spindle speed required for the particular size and character of the material of the work piece to be done. In this case, he need merely rotate the control dial for the selector valve to bring the desired spindle speed indication into position with the scribed line on the indicating notch 222 associated with the dial 201. This causes the selector valve to be rotated so as to automatically shift the desired gear combinations into position to produce the spindle speeds indicated and to at the same time adjust the feed drive transmission to give the proper feed range for the cutting tool under these conditions.

In another instance, the operator may not know what the proper spindle speed should be for a particular job but he may know the diameter of the work to be done and he may know the cutting feet per minute that may be used with the particular material of which the work piece is composed. In this latter instance, again he may read directly from the dial 201 the proper setting to condition the headstock transmission for doing this work piece since this dial indicates directly any desired cutting speed within the range of the machine and is coordinated with the work diameter in inches dial 207 so that the operator, knowing the cutting speed and diameter of the work, merely rotates dial 201 to bring cutting speed indication and the work diameter in inches indication in proper register to thereby automatically give him the correct spindle speed for the job in hand.

Under certain conditions of operation of the lathe, it is desirous to slow down or speed up the work spindle rotation as when stepping down or stepping up from one diameter to another on the work piece. Under these conditions, the operator may pre-select his next speed and set up the headstock transmission for this change while the machine is continuing to operate in the original speed. Then after the completion of the first operation, merely stopping the work spindle momentarily and re-engaging the drive thereto, will automatically set up the new preselected speed in the headstock transmission for continuing the machining operation on the new work diameter.

Associated with the spindle speed selector valve is a governor control valve 223, Figures II, XVII, XVIII, XIX, and XX, which controls the operation of the gear shifting mechanism in response to the rate of rotation of the headstock transmission gearing. This governor valve comprises a housing 223 in which a shaft 224 is rotatably mounted in appropriate bearings 225 and 226 and has securely fixed on its outer end a drive gear 227. Also fixed on the shaft 224 is the hub 228 which supports the weights 229 pivotally mounted on the pins 230. Associated with the weights 229 and slidingly mounted on the shaft 224 is the sleeve 231 having an appropriate throw-out bearing 232 mounted thereon and which in turn engages the bifurcated ends 233 of a plate 234.

The upper end of this plate 234 is securely fixed by a screw 235 to a flatted portion formed on the shaft 236 which is mounted on anti-friction bearings 237 and 238 in the housing 223 at right angles to the shaft 224. On the outer end of this shaft 236 is securely fixed the segmental gear 239 and which engages a gear 240 fixed on a shaft 241 mounted in the valve 242. This valve 242 is securely fixed to the housing 223 by appropriate screws 243. The valve has three ports, the pressure port 244 through which it derives its supply of fluid under pressure from the hydraulic pump 30, valve port 245 which connects with the selector valve and the exhaust port 246 through which the fluid is expelled through a lubricant spray manifold 260a for the headstock gearing from the valve 242 during its operational cycle. Incorporated in this valve 242 are means connected with its shaft 241 for closing off either the valve port 245 or the exhaust port 246 so that fluid pressure entering the valve 242 through the pressure port 244 can be caused to pass through either of these ports. Thus whenever the headstock transmission is stopped fluid pressure is applied to the selector valve to effect shifting of the gears and when the transmission is being driven to rotate the work spindle the fluid pressure for shifting the gears is disconnected from the selector valve and applied through the spray 260a to lubricate the transmission mechanism.

The position as shown in Figure XVIII is that when the exhaust port 246 is closed and the fluid is passing from the pressure port 244 into the valve port 245. The valve 242 is being held in this position by the spring 247 which has its one end connected to a lug 248 formed integrally with the segmental gear 239 and the other end connected to the lower end of the arm 249 pivotally mounted on a stud 250 fixed to the housing 223.

The governor control valve is fixed to the headstock housing 1 by appropriate screws 251, Figure II, and is located in such a manner that its gear 227 may be driven from the gear 34 of the headstock transmission through an idler gear 252 also rotatably mounted in the headstock housing 1. When this gear 227 is driven by rotation of the headstock transmission gearing causing the shaft 224 and the hub 228 to be rotated the weights 229 will react under influence of centrifugal force and swing outwardly causing their surfaces 253 to engage the enlarged diametrical portion 231a of the sleeve 231. As this sleeve 231 is thus slid axially on the shaft 224 the throw-out bearing 232 actuates the plate 234 causing the shaft 236 to rotate. This movement of the shaft 236 is imparted to the segmental gear 239 which in turn causes the gear 240 to rotate the shaft 241 closing the port 245 and opening the port 246 to thereby allow the fluid under pressure in the port 244 to be exhausted through the port 246 while cutting off the supply of pressure to the selector valve.

In Figure XXI is shown the manner in which these various units of the hydraulic gear shifting system are connected and interlocked with each other for obtaining the desired operation of the headstock transmission. The hydraulic system derives its supply of fluid from a fluid reservoir 254 which may be incorporated in the base of the machine. The pump 30 which is driven by the shaft 17 and is running at all times when the main drive motor is operating receives fluid from the reservoir 254 through the suction line 255 and delivers fluid under pressure to the line 256. For maintaining the desired operating pressure in line 256 a relief valve 30a is provided which discharges to the reservoir 254 through the return line 257. Fluid pressure in line 256 is delivered directly to the port 153 in shaft 148 for actuation of the brake mechanism 27 and also through the branch line 258 to the pressure port 244 of the valve 242 of the governor control valve 223. The selector valve 166 is supplied with fluid through the line 259 which appropriately connects the inlet port 172 of the selector valve casing 164 with the valve port 245 of the governor controlled valve 242. The exhaust port 246 of the valve 242 is appropriately connected with a line 260 where the fluid is allowed to exhaust into the headstock for lubricating the various parts before draining back into the reservoir 254.

Referring to Figures IX, X, and XXI, it will be noted that the casing 164 has a number of ports P formed through its outer wall directly connected with the bore 165. These ports are located in a predetermined sequential relationship with the various chambers formed in the peripheral surface of the valve rotor 166. The shifting of the shaft 134 for changing the feed rates, Figure VII, is effected by the ports 138 and 141 which are connected by their respective lines 138a and 141a to the ports 138b and 141b in the selector valve casing 164. The shifting of the shaft 82 for the triple gear 57 for fine changes of spindle speeds, Figure IV, is effected by the ports 98, 96 and 93 which are connected by their respective lines 98a, 96a and 93a, to the ports 98b, 96b and 93b of the casing 164. The shifting of the shaft 116 for the triple gear 65 for selecting the spindle speed ranges is effected by the ports 125, 127 and 129 which are connected by their respective lines 125a, 127a, and 129a to the ports 125b, 127b and 129b of the casing 164. The shifting of the shaft 102 for the triple gear 53 for further fine spindle speed changes is effected by the ports 112, 110, and 108 which are connected by their respective lines 112a, 110a, and 108a to the ports 112b, 110b and 108b of the casing 164.

Thus with fluid pressure applied to the selector valve at the port 172, rotation of the selector valve rotor 166 and speed indicating dial 201, the headstock transmission gears 53, 57, and 65 will be shifted progressively in a predetermined sequence of movements to provide the complete series of speeds for the work spindle. Also the feed rate change gear 73 will likewise be shifted automatically at the proper time during the progressive shifting of the headstock transmission gears so that regular feeds will be provided in the low and medium spindle speed ranges and fine feeds provided when the high spindle speed range is being used.

When the spindle is stopped or accelerating or decelerating below a predetermined slow speed the selector valve 166 is supplied with fluid pressure through the valve 242. As the gears in the headstock start rotating and pick up speed when one of the main drive clutches 24a or 24 is engaged, the valve 242 then shuts off the supply of fluid pressure to the selector valve 166 and allows it to be exhausted through the port 246 into the discharge line 260. Thus the selector valve may be adjusted at any time to directly effect the speed and feed changes when the main drive clutches are disengaged and the transmission gearing is not rotating or is rotating below a predetermined slow speed. When the transmission is being driven above said slow speed the selector valve may be adjusted to any position to preselect the next desired speed for the spindle so that the next time the main drive clutches are disengaged and then re-engaged the new preselected speed will be automatically obtained.

The purpose of the governor control valve 223 is to automatically render the selector valve ineffective to shift the headstock gearing when it is being driven above a predetermined slow speed by engagement of the main drive clutches 24a or 24. Also, this governor control valve is effective to permit initial maintenance of fluid pressure supply to the selector valve as the main drive clutches are first engaged and the headstock transmission is beginning to accelerate to normal operating speeds so as to assure the proper final positioning of the shiftable gears to their selected positions before fluid pressure is cut off from the selector valve. Also, this governor control valve allows fluid pressure to be automatically applied to the selector valve upon disengagement of either of the main drive clutches so that in the event the selector valve has been set to a preselected position, the hydraulic shifting of the gears will take place while the various headstock gears are decelerating to stopped condition to in this way facilitate their proper engagement in the new preselected position as the headstock transmission finally coasts to a stop. Thus the governor control valve is effective to render the selector valve operative at the time of slow rotation of the headstock transmission gearing, both when this gearing is accelerating to normal operating speed and when the transmission is slowing down to stopped condition, to automatically provide a smooth and quiet gear engagement for the hydraulic gear shifting mechanism. The governor control valve also renders the selector valve effective to shift the gearing when the spindle and transmission are stopped.

An alternate arrangement for controlling the effectiveness of the selector valve in response to the speed of rotation of the headstock transmission is by the use of a zero speed electrical control switch and a solenoid actuated hydraulic valve in place of the governor control valve 223. In Figure XXII the same hydraulic lines namely, line 258, line 259, and line 260 are shown connected with an appropriate spring return hydraulic valve 261 carried in the headstock housing 1. The valve 261 is actuated by the solenoid A which in turn is wired through an appropriate relay 262 to the zero speed switch 263 and which is also fixed in the headstock housing 1 in much the same manner as the governor control valve 223. The zero speed switch has a gear 264 mounted thereon which is in driving relationship with the gear 34 fixed on the shaft 31 and is driven at all times when the headstock transmission is being driven when the forward or reverse main drive clutch is engaged. This zero speed switch 263 (sometimes referred to as a plugging switch) can be regulated for opening or closing its contacts at any predetermined speed which might be suitable for the shifting of the gears of the headstock.

A source of electrical energy 267 is connected through a lead 266 to the solenoid A of the valve 261 and to the coil 271 of the relay 262 and is connected through the lead 265 to one side of each the forward contact 268 and the reverse contact 269 of the zero speed switch and also to the contact 270 of the relay 262. A lead 272 connects the opposite sides of the forward contact 268 and the reverse contact 269 to the relay coil 271. A lead 273 connects the opposite side of the relay contact 270 with the solenoid A of the valve 261.

With power in the leads 265 and 266 the rotation of the gears in the headstock operates the zero speed switch to cause either the forward contact 268 or the reverse contact 269 to close to energize the coil 271 through the lead 272. The energizing of coil 271 causes the contact 270 of the relay 262 to close which in turn completes the circuit through the lead 273 to energize the solenoid A so that the valve 261 will be shifted against its spring return movement to allow fluid pressure in line 258 to be cut off from the selector valve and pass into line 260 into the headstock for return to the reservoir 254. As either of the clutches 24a or 24 are again released and the brake 27 engaged the gears of the headstock will be decelerated to a stop so that the contacts 268 and 269 of the zero speed switch will be opened to cause contact 270 to open to thus de-energize the solenoid A to allow the valve 261 to return to the position whereby the discharge line 260 is shut off and the fluid under pressure in line 258 is again applied to the selector valve for shifting the gears.

Having thus fully described our invention, what we claim as new and desire to secure by Letters Patent is:

1. In a lathe, a headstock housing, a work spindle journalled in said housing, a shiftable gear change speed transmission in said housing connected to drive said work spindle, a series of shiftable gears in said transmission actuatable to effect different rates of rotation in said work spindle, a source of power, a pair of main drive clutches adapted to reversibly connect said source of power to drive said transmission, a brake associated with said clutches to arrest rotation of said transmission when said clutches are disengaged, a source of fluid pressure comprising a pump driven from said source of power, an operating device for engaging one or the other of said clutches or disengaging both of said clutches simultaneously including fluid pressure control means for automatically applying fluid pressure from said source of fluid pressure to engage said brake when either of said clutches are disengaged, fluid pressure gear shifting means for shifting the gears in said transmission, and means actuated by a predetermined rate of rotation of said transmission and work spindle to control the application of fluid pressure from said pump to said gear shifting means.

2. In a lathe transmission and control mechanism, a shiftable gear change speed transmission, a work spindle adapted to be driven from said transmission, a source of power, means for connecting or disconnecting said source of power relative to said transmission, power operated means for effecting speed changes in said transmission, and means driven from and responsive to the rate of rotation of said work spindle and transmission for rendering said power operated means operative to effect speed changes only when said spindle and transmission are operating below a predetermined slow speed or stopped.

3. In a lathe headstock, a rotatable work spindle, a shiftable gear change speed transmission, a source of power, a continuously operating input drive shaft actuatable from said source of power, clutching means for engaging or disengaging said input drive shaft in driving relationship with said transmission, a power operated gear shifting device for shifting the gears in said transmission, and means driven from said transmission and rendered operative below a predetermined slow speed of rotation or stopped condition of said work spindle and transmission effected by disengaging said input shaft from said transmission, to render said gear shifting mechanism operable to shift said gears.

4. In a lathe headstock transmission and control mechanism including a rotatable work spindle driven from a shiftable gear change speed transmission, a source of power, clutching means for applying said source of power to drive said transmission, a power operated gear shifting mechanism associated with said transmission, a single control device for selectively controlling said gear shifting mechanism for changing the rate of rotation of said work spindle, and a speed responsive control means operably connected to said transmission so that deceleration of said transmission and work spindle down to and below a predetermined slow speed by disengagement of said clutching means renders said gear shifting means operable to shift the gears in said transmission, said control means being operable by the acceleration of said transmission and work spindle up to and above said predetermined slow speed to cause said control means to render said gear shifting mechanism ineffective to shift the gearing in said transmission.

5. In a lathe headstock transmission and control mechanism, the combination of a rotatable work spindle driven from a shiftable gear change speed transmission, a source of power, clutching means for connecting or disconnecting said source of power to drive said transmission, a power operated gear shifting mechanism associated with said transmission, a single control device to cause selective operation of said gear shifting mechanism to change the rate of rotation of said work spindle, and control means driven from said transmission and spindle responsive to the rotation of said transmission and work spindle at or below a predetermined speed upon disengagement of said clutching means to render said gear shifting mechanism operative to shift the gears in said transmission, said control means being responsive to the rotation of said transmission and work spindle above said predetermined speed to automatically render said gear shifting mechanism ineffective to shift the gearing in said transmission, and a single control means for said gear shifting mechanism adapted to be operated at all times to adjust said gear shifting mechanism to select or preselect a desired speed of spindle rotation.

6. In a hydraulic gear shifting mechanism for a shiftable gear transmission comprising a source of fluid pressure, a selector valve, a series of hydraulic actuators for shifting the gears of said transmission, fluid conducting means interconnecting said selector valve to said actuators to effect a predetermined sequential shifting of said gears by said actuators upon adjustment of said selector valve, and a speed responsive fluid pressure control valve driven from said transmission and interconnected between said source of fluid pressure and said selector valve to render said selector valve operative or inoperative upon rotation of said transmission respectively below or above a predetermined speed.

7. In a hydraulic gear shifting system for a change speed transmission comprising a plurality of shiftable gear elements in said transmission, a source of power for driving said transmission, a pair of reversing clutches, a brake associated with said clutches, a control valve for alternately rendering either of said clutches or said brake operative to cause reversible driving rotation or stopping of rotation of said transmission, and hydraulic gear shifting apparatus associated with said transmission controlled in response to the rotation of said transmission above a predetermined speed upon engagement of one or the other of said clutches and responsive to the rotation of said transmission below said determined speed by the actuation of said brake, said apparatus comprising a hydraulic selector valve, a plurality of fluid pressure actuators for moving the shiftable elements of said transmission, a source of fluid pressure, and a speed responsive governor control valve driven by the rotation of said transmission interconnected between said source of pressure and said selector valve.

8. In a hydraulic gear shifting mechanism for a change speed transmission having a plurality of shiftable elements, a source of power for driving said transmission, clutch means for applying said source of power to smoothly accelerate said transmission to the desired operating speed, a fluid pressure selector valve, fluid pressure actuators adapted to shift said elements of said transmission, fluid conducting means interconnecting said selector valve to said actuators, a source of fluid pressure, a governor control valve interconnected between said source of pressure and said selector valve and driven by the rotation of said transmission when said clutch means is engaged to render said selector valve inoperative by cutting off pressure from said source of fluid pressure to said selector valve when said transmission is operated above a predetermined speed.

9. In a hydraulic gear shifting system for a change speed transmission having a plurality of shiftable elements, a source of power for driving said transmission, means including clutch and brake mechanism for applying or disconnecting said source of power from said transmission and stopping said transmission, a hydraulic selector valve, a series of fluid pressure actuators for shifting said elements of said transmission, fluid pressure conducting means interconnecting said selector valve and said actuators so that adjustment of said selector valve effects a predetermined sequential shifting of said elements, a source of fluid pressure connected to said selector valve through a speed responsive governor control valve, and means for actuating said governor control valve driven by the rotation of said transmission, said means being responsive to the rotation of said transmission below a predetermined slow speed upon disconnecting said power therefrom and applying said brake, and means rendered operative by the application of said brake to connect said source of fluid pressure to said selector valve.

10. In a hydraulic gear shifting system, a source of driving power, a change speed transmission connectable or disconnectable from said source of driving power, a series of hydraulic actuators for shifting the elements of said transmission, a hydraulic fluid selector valve connected to said actuators, a source of fluid pressure, a governor control valve connected to said source of fluid pressure, a governor control valve, means operably connected to said governor control valve responsive to the rate of rotation of said transmission below a predetermined speed for connecting said source of fluid pressure to said selector valve said means being adapted to operate said governor control valve to connect said source of pressure to a discharge outlet adapted for lubricating the working parts of said transmission when said source of driving power is connected to drive said transmission at normal operating speeds above said predetermined speed.

11. In a lathe having a headstock, a work spindle journalled in said headstock, a shiftable gear transmission associated with said work spindle, a fluid pressure selector valve, a series of hydraulic actuators connected to said selector valve for shifting the gears of said transmission, a source of driving power, means for connecting or disconnecting said power to reversibly drive said transmission, a brake associated with said transmission to arrest rotation of said transmission when said source of power is disconnected therefrom, a fluid pressure pump driven from said source of power, a centrifugal governor control valve driven by said transmission connected to said pump, a fluid supply line from said governor control valve to said selector valve, and a second fluid supply line from said governor control valve to the lubricating system for said transmission and work spindle, said governor control valve being responsive to the speed of rotation of said transmission to alternately connect pressure from said pump to said selector valve or said lubricating system.

12. In a lathe, having a headstock, a rotatable work spindle journalled in said headstock, a change speed transmission associated therewith, a source of driving power for said transmission, means for connecting or disconnecting said source of power to said transmission, a hydraulic gear shifting system for said change speed transmission, system comprising a selector valve, hydraulic actuating means for shifting the elements of said transmission connected to said selector valve, a hydraulic pump driven from said source of power, a solenoid operated hydraulic control valve connected to said hydraulic pump, fluid conducting means interconnecting said solenoid valve to said selector valve, and fluid conducting means connecting said solenoid valve to the lubricating system of said transmission, a zero speed electric controlled switch driven by the rotation of said transmission and responsive to the rate of rotation thereof to control the operation of said solenoid control valve to connect fluid pressure from said pump to said selector valve when said source of power is disconnected from said transmission and to connect said fluid pressure from the pump to the lubricating system of said transmission when said source of power is connected to drive said transmission.

13. In a speed changing device for an adjustable speed transmission having a series of shiftable elements, a source of power for driving said transmission, means for connecting or disconnecting said source of power therefrom, a control lever for operating said connecting and disconnecting means, a speed selector device adjustable to effect a series of speed changes in said transmission, a speed responsive control device for said speed selector device driven from the rotation of said transmission to render said speed selector device ineffective to cause speed changes in said transmission when said transmission is being driven at normal operating speeds above a predetermined slow speed and to render said speed selector device effective to cause speed changes in said transmission when said transmission is disconnected from said source of driving power and operating below said predetermined speed, and means for pre-adjusting said speed selector device to effect another series of speeds in said transmission while said transmission is operating at normal speeds, and means operated by the operation of said connecting and disconnecting means to momentarily disconnect said source of power from driving said transmission to apply power through said speed responsive control device to cause said speed selector to effect said preselected speed in said transmission.

14. In a machine tool having a change speed transmission, speed changing means for said transmission, a governor control means for said speed changing means driven from and responsive to the rate of rotation of said transmission to render said speed changing means operable to make speed changes in said transmission when said transmission is stopped, or is operating at a predetermined slow speed of rotation, and means for manually adjusting said speed changing means at any time for selecting or preselecting speed changes in said transmission.

RICHARD K. LE BLOND.
HARRY C. KEMPER.

(References on following page)

REFERENCES CITED

The following references are of record in the file of this patent:

UNITED STATES PATENTS

| Number | Name | Date |
|---|---|---|
| 876,164 | Ford | Jan. 7, 1908 |
| 1,511,574 | Mortsell | Oct. 14, 1924 |
| 1,619,705 | Charlton | Mar. 1, 1927 |
| 1,915,986 | Ferris | June 27, 1933 |
| 2,115,097 | Durham | Apr. 26, 1938 |
| 2,161,088 | Reilly et al. | June 6, 1939 |
| 2,167,790 | Whitehead | Aug. 1, 1939 |
| 2,181,963 | Carter et al. | Dec. 5, 1939 |
| 2,224,887 | Van Hammersveld | Dec. 17, 1940 |
| 2,225,913 | Lange | Dec. 24, 1940 |
| 2,239,443 | Groene | Apr. 22, 1941 |
| 2,255,739 | Curtis | Sept. 9, 1941 |
| 2,277,643 | Holmes | Mar. 24, 1942 |
| 2,306,418 | Wilson | Dec. 29, 1942 |
| 2,330,426 | Hoelscher | Sept. 28, 1943 |
| 2,349,297 | Neracher et al. | May 23, 1944 |
| 2,352,212 | Lang et al. | June 27, 1944 |
| 2,355,869 | Johnson | Aug. 15, 1944 |
| 2,360,181 | Waltz | Oct. 10, 1944 |
| 2,382,934 | Armitage | Aug. 14, 1945 |

FOREIGN PATENTS

| Number | Country | Date |
|---|---|---|
| 27,180 | Norway | May 5, 1915 |